(12) United States Patent
Charbit et al.

(10) Patent No.: US 8,594,151 B2
(45) Date of Patent: Nov. 26, 2013

(54) PILOT SEQUENCE DETECTION

(75) Inventors: Gilles Charbit, Farnborough (GB); Ülo Parts, Helsinki (FI); Kaj Jansen, Salo (FI)

(73) Assignee: Nokia Corporation, Espoo (FI)

( * ) Notice: Subject to any disclaimer, the term of this patent is extended or adjusted under 35 U.S.C. 154(b) by 1551 days.

(21) Appl. No.: 11/585,814

(22) Filed: Oct. 25, 2006

(65) Prior Publication Data
US 2007/0098100 A1  May 3, 2007

Related U.S. Application Data

(60) Provisional application No. 60/731,255, filed on Oct. 31, 2005.

(51) Int. Cl.
*H04B 1/69* (2011.01)
*H04B 1/713* (2011.01)

(52) U.S. Cl.
USPC ........... 375/142; 375/143; 375/148; 375/149; 375/260

(58) Field of Classification Search
USPC ........... 375/26, 262, 263, 343, 260, 259, 143, 375/150, 140; 455/449, 525
See application file for complete search history.

(56) References Cited

U.S. PATENT DOCUMENTS

| | | | | |
|---|---|---|---|---|
| 5,956,333 A * | 9/1999 | Zhou et al. | | 375/152 |
| 5,982,763 A * | 11/1999 | Sato | | 370/342 |
| 6,157,820 A * | 12/2000 | Sourour et al. | | 455/226.2 |
| 6,275,186 B1 * | 8/2001 | Kong | | 342/363 |
| 6,768,729 B1 * | 7/2004 | Ohsuge | | 370/342 |
| 7,272,126 B2 * | 9/2007 | Soltanian et al. | | 370/335 |
| 7,315,566 B2 | 1/2008 | Tanno et al. | | |
| 7,433,389 B2 * | 10/2008 | Soerensen et al. | | 375/150 |
| 7,693,106 B1 * | 4/2010 | Ishikawa et al. | | 370/331 |
| 2004/0137863 A1 * | 7/2004 | Walton et al. | | 455/130 |

(Continued)

FOREIGN PATENT DOCUMENTS

| | | |
|---|---|---|
| EP | 1 104 977 A1 | 6/2001 |
| KR | 2003-0068484 | 8/2003 |
| WO | WO 2007/023359 A2 | 3/2007 |

OTHER PUBLICATIONS

Tanno, M. et al, "Three-Step Fast Cell Search Algorithm Utilizing Common Pilot Channel for OFCDM Broadband Packet Wireless Access", Vehicular Technology Conference, 2002. Proceedings., vol. 3 pp. 1575-1579, Fall 2002.

(Continued)

*Primary Examiner* — Qutbuddin Ghulamali
(74) *Attorney, Agent, or Firm* — Alston & Bird LLP

(57) ABSTRACT

A user equipment and corresponding method detect a frequency division permanent common pilot and include a controller configured to use a sliding correlator with a frequency division phase-shift, an averaging unit configured to average a peak magnitude output of the sliding correlator over a predetermined number of sub-frames for each of possible reference pilot sequence and each sample shift of the sliding correlator, and a maximum peak storing unit configured to store first and second maximum peaks depending on corresponding ratios and a threshold. The user equipment and method thereof also include a pilot sequence index candidate storing unit configured to store a pilot sequence index candidate for each shift of the sliding correlator. The user equipment and method thereof include a selector configured to select the pilot sequence index candidate with a lowest peak ratio to shift the sliding correlator.

28 Claims, 8 Drawing Sheets

(56) References Cited

U.S. PATENT DOCUMENTS

| | | | |
|---|---|---|---|
| 2004/0179627 A1* | 9/2004 | Ketchum et al. | 375/267 |
| 2006/0126491 A1* | 6/2006 | Ro et al. | 370/208 |
| 2006/0203950 A1* | 9/2006 | Chung et al. | 375/376 |

OTHER PUBLICATIONS

Tanno, M. et al, "*Experiments on Three-Step Fast Cell Search Algorithm Employing Common Pilot Channel for OFCDM Broadband Packet Wireless Access in Forward Link*", Vehicular Technology Conference, 2004. VTC2004-Fall. 2004 IEEE 60th, vol. 2 pp. 968-973, Sep. 2004.
Fujii, M. et al, "*Cell Search Scheme Embedded With Carrier Frequency Synchronization in Broadband OFDM-CDM Systems*", Global Telecommunications Conference, 2002. GLOBECOM '02. IEEE, vol. 1 pp. 238-243, Nov. 2002.
Hanada, Y. et al, "Three-Step Cell Search Algorithm for Broadband Multi-Carrier CDMA Packet Wireless Access", Personal, Indoor and Mobile Radio Communications, 2001 12$^{th}$, IEEE International Symposium on, vol. 2 pp. G-32-G-37, Sep./Oct. 2001.
Bahl, S.K., "Cell Searching in WCDMA", Potentials, IEEE, vol. 22 pp. 16-19, Apr.-May 2003.
International Search Report PCT/IB2006/003025 filed Oct. 27, 2006.
R1-051147 Basic Structure of Control Channel and Synchronization Channel for Scalable Bandwidth in Evolved UTRA Downlink, NTT DoCoMo, Fujitsu, Mitsubishi Electric Corporation, NEC, Panasonic, Sharp, Toshiba Corporation, 3GPP TSG-RAN WG1 Meeting #42bis, Oct. 10-14, 2005, pp. 1-13.
R1-051057 Downlink Synchronization Channel Schemes for E-UTRA, Texas Instruments, 3GPP TSG-RAN WG1 Meeting #42bis, Oct. 10-14, 2005, pp. 1-12.
R1-051156 Proposal for the Downlink Synchronization Channel for E-UTRA, Nortel 8.3, 3GPP TSG-RAN1 Meeting #42bis, San Diego, USA, Oct. 10-14, 2005, pp. 1-12.
R1-050622 Principles for the Evolved UTRA Radio-Access Concept, Alcatel, Ericsson, Fujitsu, LGE, Motorola, NEC, Nokia, NTT DoCoMo, Panasonic, RITT, Samsung, Siemens, TSG-RAN WG1 Ad Hoc on LTE, Sophia Antipolis, France, Jun. 20-21, 2005, pp. 1-5.
R1-050590 Physical Channels and Multiplexing in Evolved UTRA Downlink, NTT DoCoMo, 3GPP TSG RAN WG1 Ad Hoc on LTE, Sophia Antipolis, France, Jun. 20-21, 2005, pp. 1-24.
3GPP TR 25.913 v2.0.0, 3rd Generation Partnership Project; Technical Specification Group Radio Access Network; Requirements for Evolved UTRA and UTRAN (Release 7), (May 2005), pp. 1-10.
Office Action dated Mar. 31, 2010 and issued in connection with corresponding Korean Patent Application No. 2008-7013206 and translation there; 6 sheets.
Office Action from Chinese Patent Application No. 200680044427.5, dated Jul. 10, 2012.
Hanzo, L., et al.; "*OFDM and MC-CDMA for broadband, multi-user communications, WLANs broadcasting;*" dated 2003; retrieved on Mar. 28, 2013 from <http://www.google.com/search?q=OFDM+and+MC-CDMA+for+broadband+%2Cmulti-user+communications%2C+WLANs+broadcastin&rls=com.microsoft:en-us&ie=UTF-8&oe=UTF-8&startIndex=&startPage=1>.
Extended European Search Report for Application No. EP 06 82 0827 dated Oct. 4, 2013.
R1-050707 NTT DoCoMo et al.: *Physical Channels and Multiplexing in Evolved UTRA Downlink,* 3GPP Draft; Downlink Physical Channel Multiplexing, 3$^{rd}$ Generation Partnership Project (3GPP), Mobile Competence Centre,; vol. RAN WG1, Aug. 25, 2005, 15 pages.

\* cited by examiner

US 8,594,151 B2

PILOT SEQUENCE DETECTION

REFERENCE TO RELATED APPLICATIONS

This application claims priority of U.S. Provisional Patent Application Ser. No. 60/731,255, filed Oct. 31, 2005. The subject matter of this earlier filed application is hereby incorporated by reference.

BACKGROUND OF THE INVENTION

1. Field of the Invention

The present invention relates to a sliding correlator using a phase-shift in frequency domain to detect a pilot sequence with a time-division multiplexed pilot structure that meets Universal Terrestrial Radio Access Network Long Term Evolution (UTRAN LTE) requirements for cell acquisition and cell measurement.

2. Description of the Related Art

The synchronization channel (SCH) is for cell search. It consists of two sub-channels, a primary synchronization channel (P-SCH) and a secondary synchronization channel (S-SCH). The 10 ms frames of the P-SCH and S-SCH are divided into 15 slots, each of length 2560 chips. The synchronization channel is non-orthogonal to the other channels and is only switched on during the first 256 chips of each slot. The P-SCH is the same in all slots of the frame, where as the S-SCH changes every slot. This enables the mobile to reasonably quickly search for the P-SCH to establish the frame timing, and then use the S-SCH to find the slot timing. The sequence on the S-SCH also indicates which scrambling code is used in the cell.

Conventional algorithms to detect the S-SCH in 1.25 MHz may be best processed in a time domain providing that most sub-carriers in an orthogonal frequency division multiplexing (OFDM) symbol are allocated to an S-SCH code. A relatively small number of sub-carriers may be mapped to system information in the same OFDM symbol. For instance, in a 1.25 MHz narrow band, a pilot sequence of 16 sub-carriers may be mapped to one sub-carrier every five sub-carriers to pilots in the OFDM symbol (one permanent common pilot OFDM symbol, followed by six OFDM symbols containing data, and one dedicated pilot, in a time-division multiplexing (TDM) pilot structure with sub-frame of length 0.5 ms, as shown in FIG. 1). However, if similar time-domain (TD) algorithms are considered for pilot sequence detection, the performance of the algorithms is severely compromised by a relatively large number of non-empty sub-carriers mapped to system information or data in the OFDM symbol containing the pilot.

A conventional pilot sequence detection system may include a multiplexed (TDM) pilot structure that meets Universal Terrestrial Radio Access Network Long Term Evolution (UTRAN LTE) requirements. The S-SCH mapped proposed to pilot sequence provides using a scattered pilot structure.

As with S-SCH, a pilot sequence detection method may be used with decoding of system information common to all bandwidth carried by the pilot OFDM symbol, e.g., 1.25, 2.5, 5, 10, and 20 MHz. This is final check to ensure that pilot sequence is correctly detected. Decoding of system information requires simple channel estimation (i.e., multiplication of received pilot symbols by reference pilot symbols followed by frequency-domain FIR filter smoothing). As the number of sub-carriers allocated to common system information is rather small (e.g., around 60 sub-carriers), the code length is relatively small and decoding complexity may be kept low. It would be preferable to rely on false detection mechanism to avoid reading system information during (fast) cell measurements for handover.

SUMMARY OF THE INVENTION

In accordance with an embodiment of the present invention, there is provided a frequency division permanent common pilot detection method and computer program embodied on a computer readable medium including using a sliding correlator with a frequency division phase-shift, and averaging a peak magnitude output of the sliding correlator over a predetermined number of sub-frames for each of possible reference pilot sequence and each sample shift of the sliding correlator. The method and computer program also include storing first and second maximum peaks depending on corresponding ratios and a threshold, storing a pilot sequence index candidate for each shift of the sliding correlator, and selecting the pilot sequence index candidate with a lowest peak ratio to shift the sliding correlator.

In accordance with an embodiment of the present invention, there is provided a frequency division permanent common pilot detection method and computer program embodied on a computer readable medium including receiving a signal at a receiver and executing a sliding correlator by applying a phase-shift in frequency domain combined with an averaging and threshold mechanism to the signal to determine a pilot sequence with a time-division multiplexed pilot structure for cell acquisition and cell measurements.

In accordance with an embodiment of the present invention, there is provided a user equipment to detect a frequency division permanent common pilot including a controller configured to use a sliding correlator with a frequency division phase-shift, an averaging unit configured to average a peak magnitude output of the sliding correlator over a predetermined number of sub-frames for each of possible reference pilot sequence and each sample shift of the sliding correlator, and a maximum peak storing unit configured to store first and second maximum peaks depending on corresponding ratios and a threshold. The user equipment also includes a pilot sequence index candidate storing unit configured to store a pilot sequence index candidate for each shift of the sliding correlator. The user equipment includes a selector configured to select the pilot sequence index candidate with a lowest peak ratio to shift the sliding correlator.

In accordance with an embodiment of the present invention, there is provided a user equipment to detect a frequency division permanent common pilot including a receiver configured to receive a signal. The user equipment also includes a controller configured to execute a sliding correlator by applying a phase-shift in frequency domain combined with an averaging and threshold mechanism to the signal to determine a pilot sequence with a time-division multiplexed pilot structure for cell acquisition and cell measurements.

In accordance with an embodiment of the present invention, there is provided a user equipment to detect a frequency division permanent common pilot including controller means for using a sliding correlator with a frequency division phase-shift, an averaging means for averaging a peak magnitude output of the sliding correlator over a predetermined number of sub-frames for each of possible reference pilot sequence and each sample shift of the sliding correlator, and maximum peak storing means for storing first and second maximum peaks depending on corresponding ratios and a threshold. The user equipment includes pilot sequence index candidate storing means for storing a pilot sequence index candidate for each shift of the sliding correlator. The user equipment also includes selector means for selecting the pilot sequence index candidate with a lowest peak ratio to shift the sliding correlator.

In accordance with an embodiment of the present invention, there is provided a user equipment to detect a frequency division permanent common pilot including receiver means for receiving a signal. The user equipment also includes controller means for executing a sliding correlator by applying a phase-shift in frequency domain combined with an averaging and threshold mechanism to the signal to determine a pilot sequence with a time-division multiplexed pilot structure for cell acquisition and cell measurements.

BRIEF DESCRIPTION OF THE DRAWINGS

Further embodiments, details, advantages and modifications of the present invention will become apparent from the following detailed description of the preferred embodiments which is to be taken in conjunction with the accompanying drawings, in which.

DETAILED DESCRIPTION OF THE PREFERRED EMBODIMENTS

In accordance with an embodiment of the present invention, it is assumed that a primary synchronization channel (P-SCH) is used for initial cell search and coarse timing/carrier acquisition. The P-SCH may be transmitted at least once every 4.6 ms to allow averaging and inter radio access technologies (inter-RAT) measurements, i.e., during GSM idle frame. In accordance with an embodiment of the present invention, it is assumed that no secondary synchronization channel (S-SCH) is used.

Figure 1:
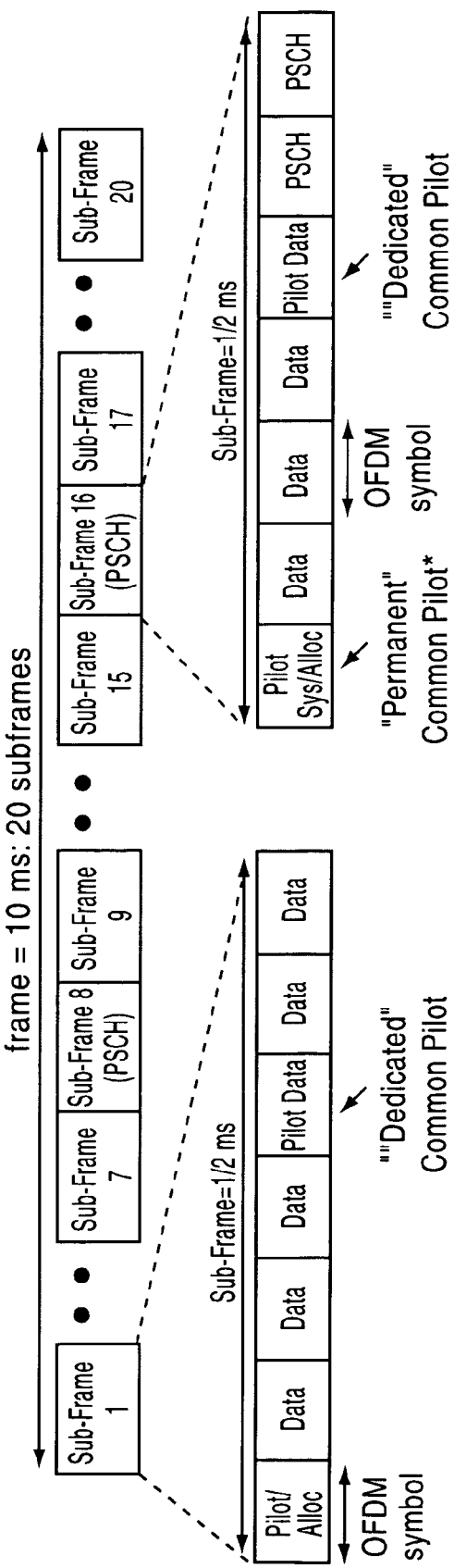
FIG. 1 illustrates a pilot sequence mapped to one sub-carrier every five sub-carriers to pilots in an orthogonal frequency division multiplexing symbol.
Figure 2:
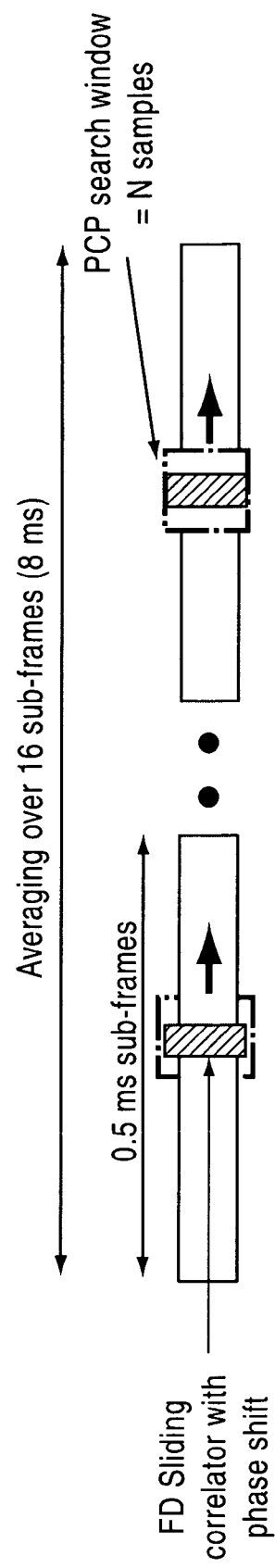
FIG. 2 illustrates a frequency division (FD) permanent common pilot (PCP) detection method using the sliding correlator with an FD phase-shift, in accordance with an embodiment of the present invention.

A sliding correlator implemented by means of a phase-shift in frequency domain is combined with an averaging and threshold mechanism to detect the pilot sequence in the frequency domain, i.e., a post Fast fourier transform (FFT). FIG. 2 illustrates a frequency division (FD) permanent common pilot (PCP) detection method using the sliding correlator with FD phase-shift, in accordance with an embodiment of the present invention.

The received pilot sequence is cross-correlated with the conjugate of each of 16 reference pilot sequences in a 16-sequence Hadamard set of length 16. The phase-shift in frequency domain (i.e., post FFT) is combined with the cross-correlation operation to correct tentatively the possible sample timing offset of FFT window in a range of [−N, N] samples. It is assumed that a sample-offset in an FFT window introduces a phase shift of $2\pi$ in a frequency domain over the FFT bandwidth. Further, the averaging of the sliding correlator peak magnitude is carried out over 16 sub-frames to average out the noise and interference.

The threshold mechanism is used to tentatively reject pilot sequence detection which is deemed not reliable. The threshold mechanism reduces probability of false detection in cases of weak signal, and/or in the non-signal presence scenario. If a false detection occurs, a user equipment (UE) may abandon the search as there is no need to attempt reading system information during initial cell acquisition.

Figure 3:
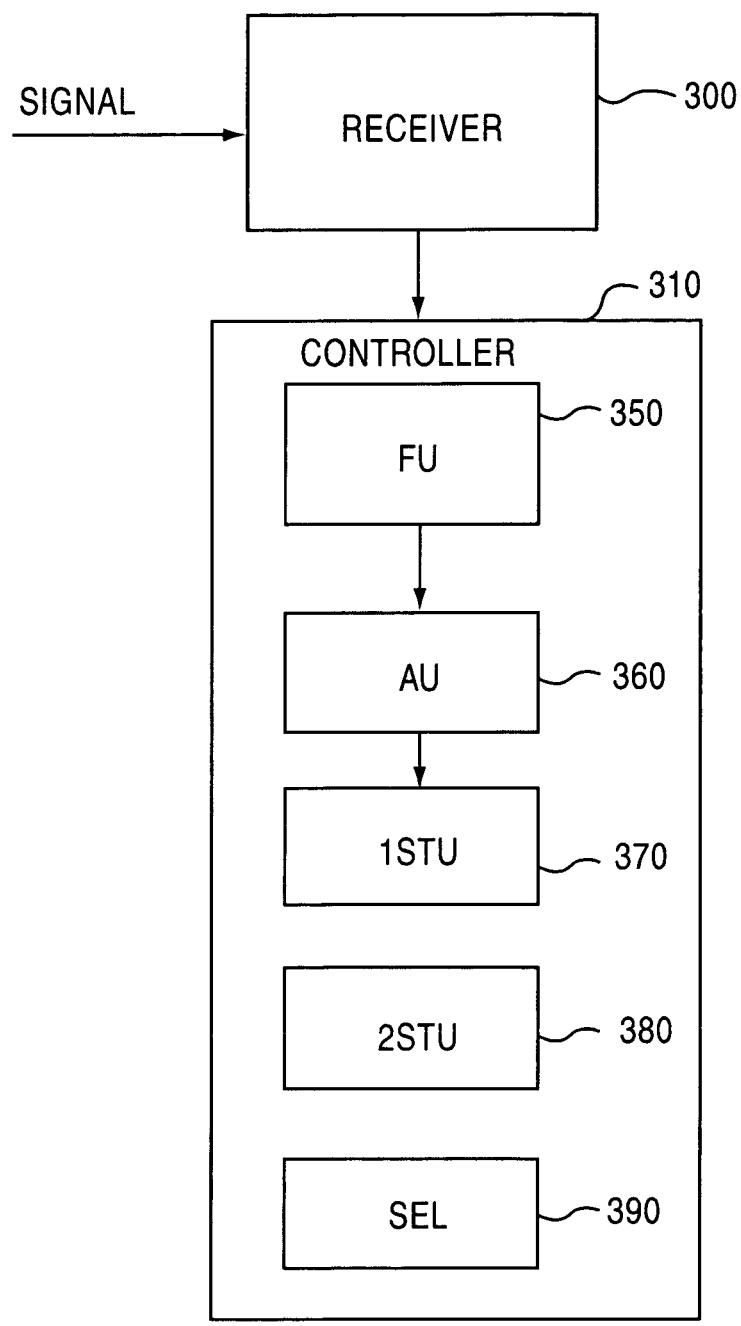
FIG. 3 illustrates a user equipment executing the FD PCP detection method using the sliding correlator with the FD phase-shift, in accordance with an embodiment of the present invention.

FIG. 3 illustrates the UE executing the FD PCP detection method using the sliding correlator with FD phase-shift, in accordance with an embodiment of the present invention. A receiver 300 receives a signal and a controller 310 would execute the sliding correlator by applying the phase-shift in frequency domain combined with an averaging and threshold mechanism to the signal to determine a pilot sequence with a time-division multiplexed pilot structure for cell acquisition and cell measurements.

In accordance with an embodiment of the present invention, the controller 310 may include a first unit 350 using the sliding correlator with the frequency division phase-shift, and an averaging unit 360 averaging a peak magnitude output of the sliding correlator over a predetermined number of sub-frames for each of possible reference pilot sequence and each sample shift of the sliding correlator. The controller 310 may also include a first storing unit or a maximum peak storing unit 370 storing first and second maximum peaks depending on corresponding ratios and a threshold. The controller 310 may include a second storing unit or a pilot sequence index candidate storing unit 380 to store a pilot sequence index candidate for each shift of the sliding correlator. The controller 310 may also include a selector 390 to select the pilot sequence index candidate with a lowest peak ratio to shift the sliding correlator.

Figure 4A:
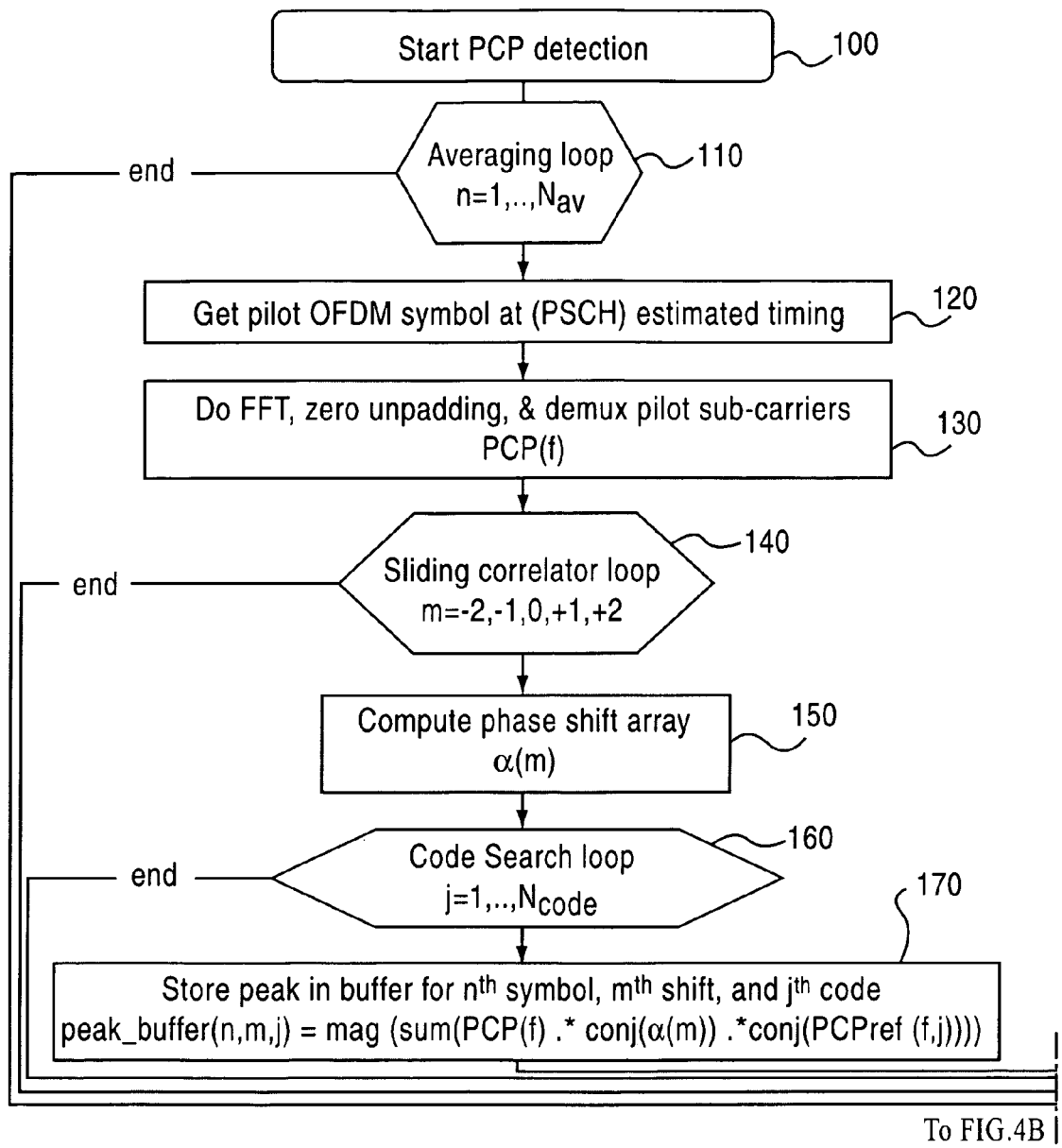
FIG. 4 illustrates the FD PCP detection method using the sliding correlator with the FD phase-shift, in accordance with an embodiment of the present invention.
Figure 4B:
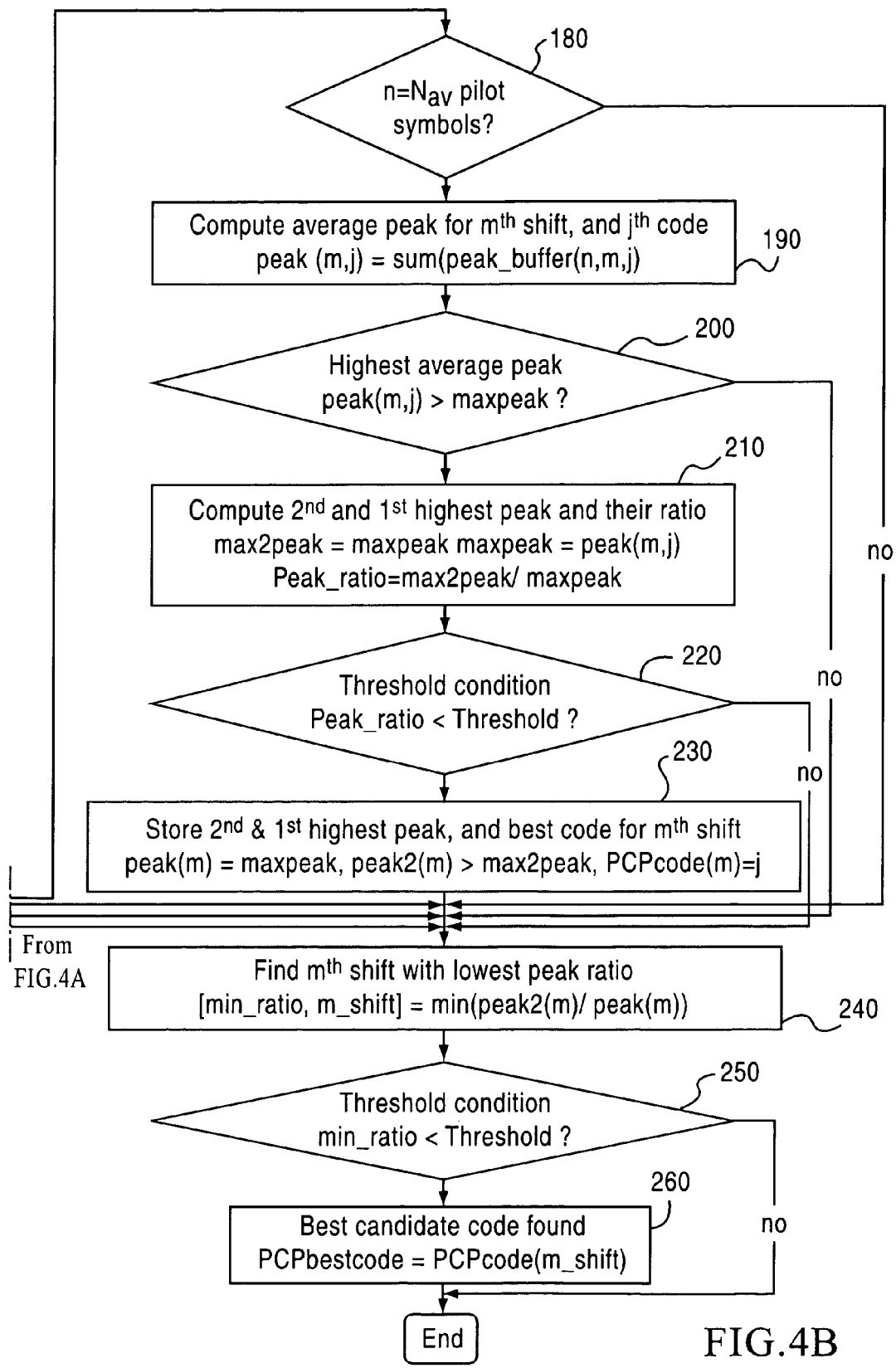

FIG. 4 illustrates an FD PCP detection method using a sliding correlator with the FD phase-shift performed, for instance, by the UE, in accordance with an embodiment of the present invention. At step 100, the PCP detection method begins. At step 110, an averaging loop is performed. At step 120, a pilot OFDM symbol at P-SCH estimated timing is obtained. At step 130, an FFT is performed, with zero unpadding and pilot sub-carriers PCP(f) are demultiplexed. At step 140, a sliding correlator loop is performed. At step 150, a phase shift array, $\alpha(m)$, is computed. At step 160, a code search loop is performed. At step 170, a peak is stored in a buffer for $n^{th}$ symbol, $m^{th}$ shift, and $j^{th}$ code, where a peak_buffer(n, m, j)=mag(sum(PCP(f).*conj($\alpha$(m)).*conj(PCPref (f,j)))).

At step 180, a determination of whether n equals $N_{av}$ pilot symbols. If n equals $N_{av}$ pilot symbols, at step 190, an average peak for $m^{th}$ shift, and $j^{th}$ code, where peak (m, j)=sum(peak_buffer(n, m, j)). Otherwise, from step 180, the method proceeds to step 240, to be later described. At step 200, the method determines whether a highest average peak, peak(m, j), is greater than a maxpeak. If the highest average peak is greater than the maxpeak, at step 210, the method computes a first and second highest peaks and a ration thereof, where max2peak=maxpeak maxpeak=peak(m, j), and peak_ratio=max2peak/maxpeak. Otherwise, from step 200, the method proceeds to step 240, to be later described.

At step 220, the method determines a threshold condition. Specifically, the method determines whether a peak_ratio is less than a threshold. If the peak_ratio is less than the threshold, at step 230, the method stores the first and second highest peaks, and best code for $m^{th}$ shift, where peak(m)=maxpeak, peak2(m) is greater than max2peak, and PCPcode(m)=j. At step 240, a $m^{th}$ shift with lowest peak ratio is found, where

[min_ratio, m_shift]=min(peak2(m)/peak(m)). At step 250, the method determines a threshold condition, which is, whether min_ratio is less than the threshold. If min_ratio is less than the threshold, at step 260, the method determines that the best candidate code found is PCPbestcode=PCPcode (m_shift). If min_ratio is not less than the threshold, the method ends.

Figure 5:
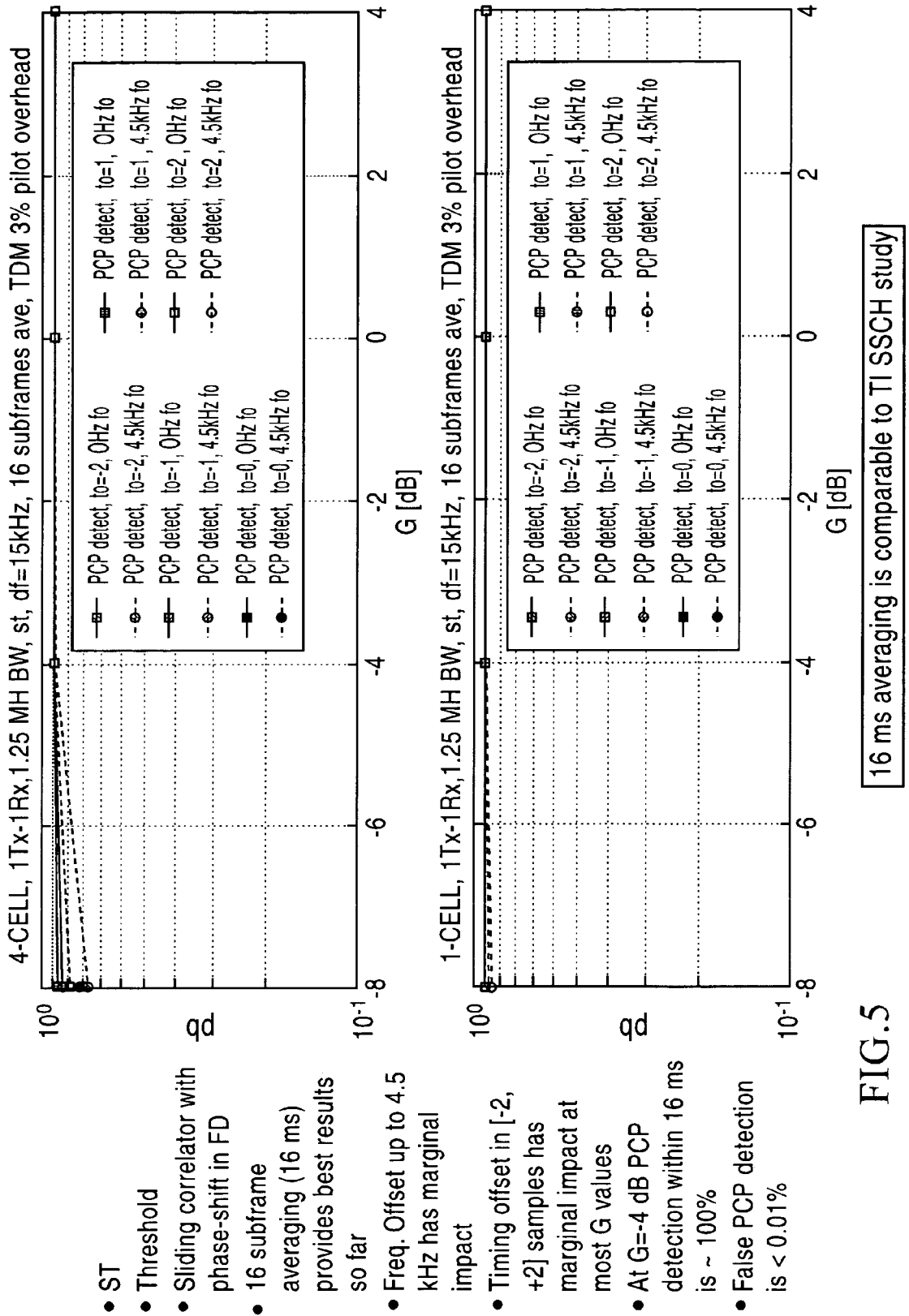
FIGS. 5-7 illustrate PCP detection simulation and performance thereof, in accordance with an embodiment of the present invention.
Figure 6:
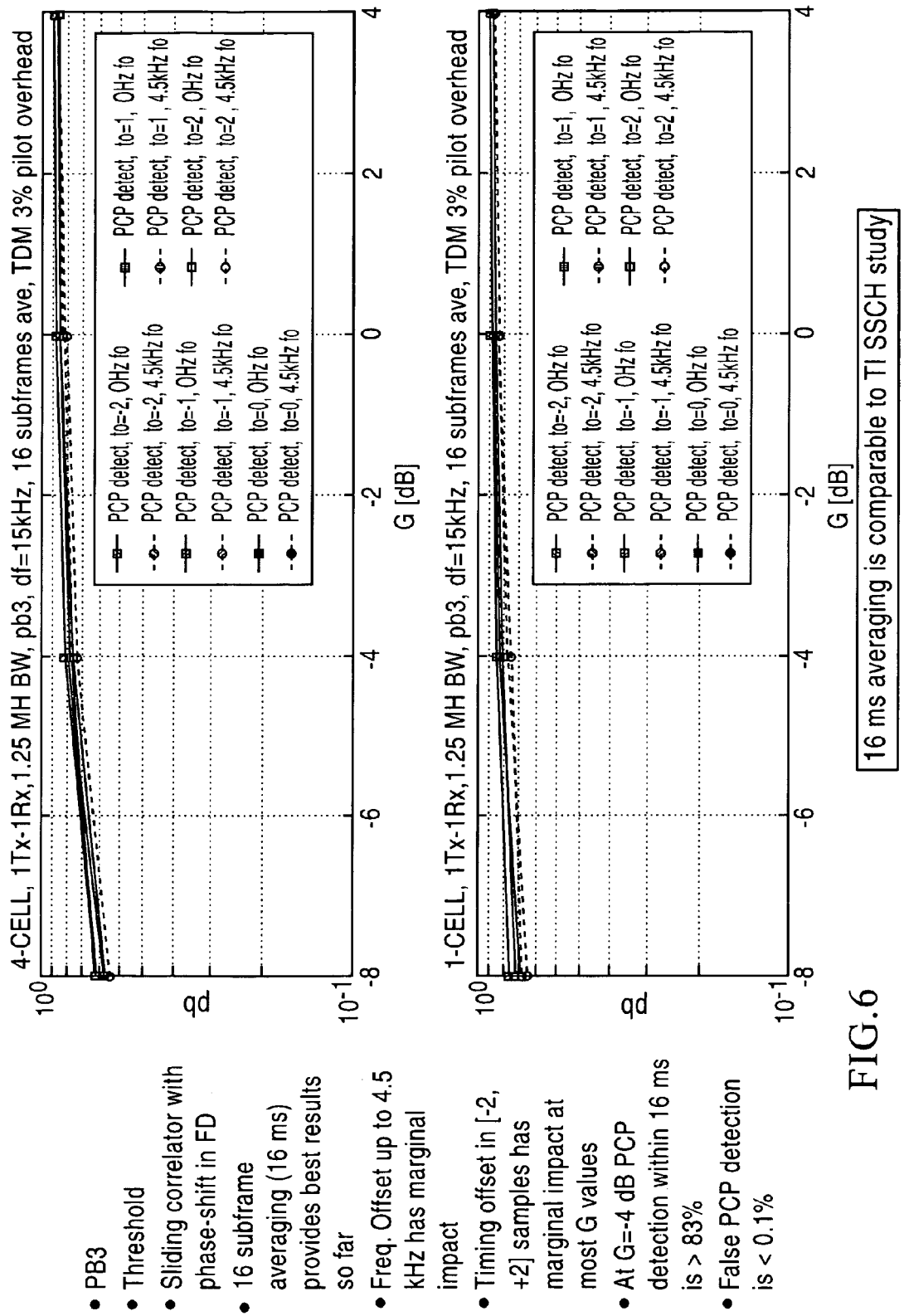
Figure 7:
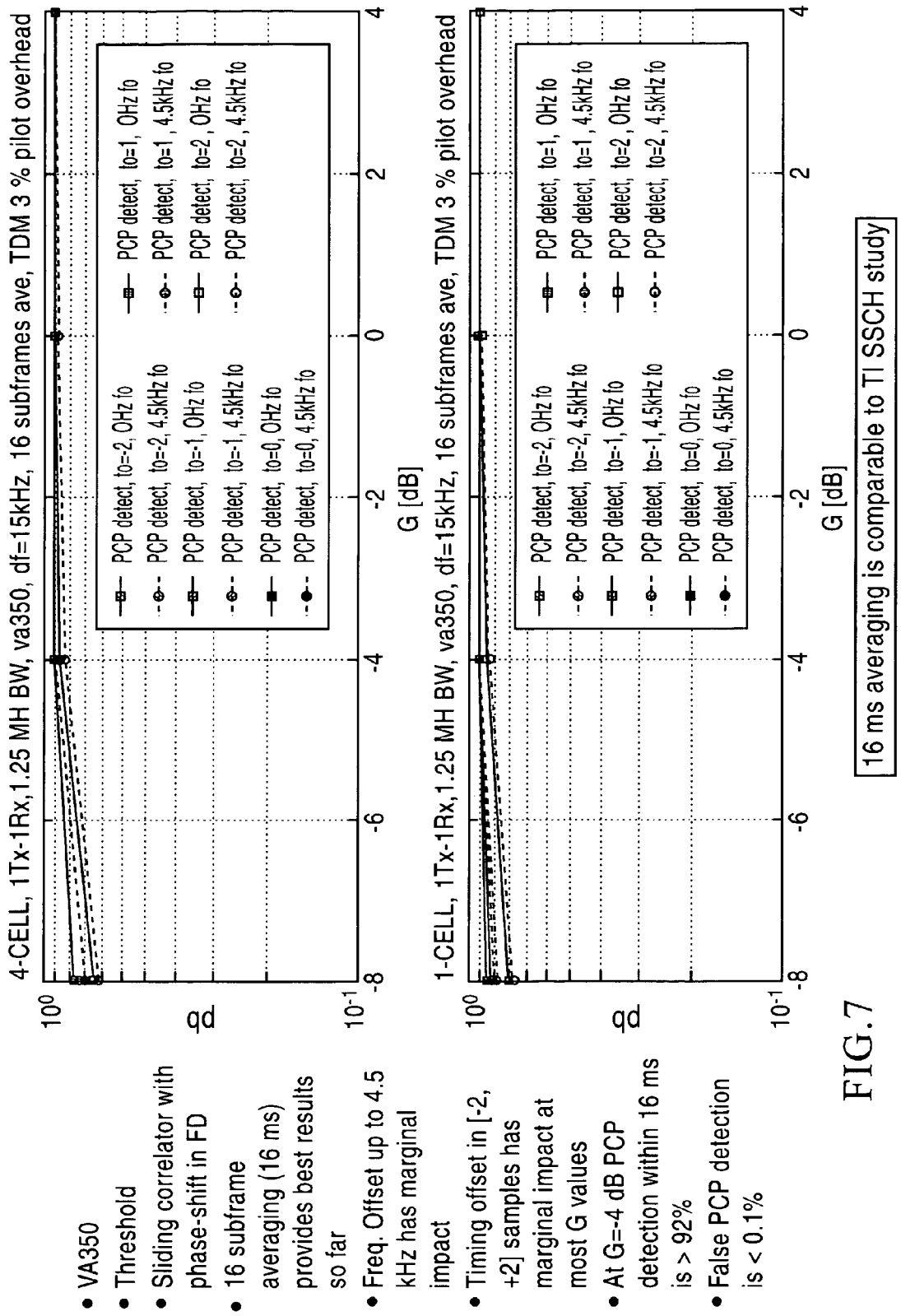

FIGS. 5-7 illustrate PCP detection simulation and performance thereof, in accordance with an embodiment of the present invention. As illustrated in FIGS. 4-6, a 16 sub-frame averaging (16 ms) provides best results and a frequency offset up to 4.5 kHz has a marginal impact. A timing offset in [−2, +2] samples has a marginal impact at most G [dB] values and at G=−4 dB PCP detection within 16 ms is, in some instances, 100 percent, greater than 83 percent, or greater than 92 percent. A false PCP detection is less than 0.01 percent.

Parameters that may be used for a Permanent Common Pilot (PCP) detection simulation include 15 kHz sub-carrier separation, 75 active sub-carriers for 1.25 MHz bandwidth (0.9 bandwidth efficiency). Also 1.92 MHz FFT sampling frequency and 128 FFT size may be used. A sub-frame length of 0.5 ms with 7 OFDM symbols/sub-frame may be implemented. A frequency offset of up to normalized 0.3=4.5 kHz and the time offset [−2, −1, 0, 1, 2] samples may be used. FD PCP cross-correlation method, in accordance with an embodiment of the present invention, uses a sliding-correlator with phase-shift in frequency domain, 16-subframe averaging, and a threshold mechanism.

According to an embodiment of the present invention, un-synchronized 4-cell network (fixed delay between cells) includes a Geometry value G as follows: $G=I_{own}/(I_{other}+N_{AWGN})$. A DIR value$=I_1/(I_2+I_3+N_{AWGN})=-8.1$ dB, where one stronger interferer and two equal weaker interferers may occur, other interferers may be modeled as Additive White Gaussian Noise (AWGN). Noise power may be represented as follows: (IX AWGN interferers) is 80 percent of $(I_{other}+N_{AWGN})$, for instance, $G=-7$ dB, $I_{own}=0$ dB, $N_{AWGN}=6$ dB, $I_{other}=0$ dB ($I_1=-1.75$ dB, $I_2, I_3=-7.77$ dB).

The PCP detection simulation may be applied for a single-cell network and a Time Division Multiplexing (TDM) pilot structure, one subc every five allocated to pilot, with cell-specific orthogonal Hadamard pilot sequences. No over-sampling is done, no TX pulse shaping/RX raised robot cosine filter. The PCP detection may further provide a threshold-based false PCP detection mechanism.

Sliding correlator requires a search window of 2N samples, with N typically in a region of two depending on the performance of the P-SCH detection. Each sample offset of the sliding correlator requires an FFT to allow FD processing. However, in narrow band 1.25 MHz, the FFT length is 128 and hence the complexity is relatively small. For best performance versus complexity compromise, the averaging is limited to 16 sub-frames (i.e. 8 ms). The buffering requirements do not increase with the signal bandwidth. Buffering can be kept practical by storing the magnitude of cross-correlator peak for each of the 16 possible reference pilot sequence and each sample shift of the sliding correlator using efficient packing for efficient DSP memory management. Eight bits per correlator output may be sufficient with adequate fixed-point arithmetic scaling.

The invention can be mainly implemented in the baseband by means of digital signal processors (DSP), memory, and FFT hardware (HW) accelerator (though faster DSP may allow FFT DSP Software (SW) implementation).

It is to be understood that in the embodiment of the present invention, the operations are performed in the sequence and manner as shown although the order of some operations and the like may be changed without departing from the spirit and scope of the present invention.

The steps of a method or algorithm described in connection with the embodiments disclosed herein may be embodied directly in hardware, in a software module executed by a processor, or in a combination of the two. A software module may reside in random access memory (RAM) memory, flash memory, read only memory (ROM) memory, erasable programmable read-only memory (EPROM) memory, electrically erasable programmable read-only memory (EEPROM) memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an application specific integrated circuit (ASIC). The ASIC may reside in a user terminal. In the alternative, the processor and the storage medium may reside as discrete components in a user terminal.

With respect to the present invention, network devices may be any device that utilizes network data, and can include switches, routers, bridges, gateways or servers. In addition, while the terms packet and datagram have been used in the description of the present invention, the invention has import to many types of network data. For purposes of this invention, the term packet includes packet, cell, frame, datagram, bridge protocol data unit packet, packet data and any equivalents thereof.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed:

1. A method comprising:
   using a sliding correlator with a frequency division phase-shift;
   averaging a peak magnitude output of the sliding correlator over a predetermined number of sub-frames for each of a plurality of possible reference pilot sequences and each of a plurality of sample shifts of the sliding correlator;
   causing first and second maximum peaks to be stored in an instance in which a ratio between respective first and second maximum peaks is less than a threshold;
   causing a pilot sequence index candidate for each of the plurality of sample shifts of the sliding correlator to be stored; and
   selecting the pilot sequence index candidate with a lowest peak ratio to shift the sliding correlator.

2. The method as recited in claim 1, wherein averaging the peak magnitude output comprises a processor averaging the peak magnitude output.

3. A method comprising:
   receiving a signal; and
   executing a sliding correlator by applying a phase-shift in a frequency domain combined with an averaging and threshold mechanism to the signal to determine a pilot sequence with a time-division multiplexed pilot structure for cell acquisition and cell measurements, wherein applying the phase-shift in the frequency domain combined with the averaging and threshold mechanism comprises averaging a peak magnitude output of the sliding correlator for a predetermined number of sub-frames, and wherein the sliding correlator is shifted using a pilot sequence index candidate with a lowest peak ratio.

4. The method as recited in claim 3, wherein the executing of the sliding correlator comprises:
performing an averaging loop;
obtaining a pilot orthogonal frequency division multiplexing symbol at a primary synchronization channel;
performing a Fast fourier transform, with zero unpadding and demultiplexing pilot sub-carriers;
performing a sliding correlator loop;
computing a phase shift array;
performing a code search loop;
causing a peak to be stored in a buffer for an $n^{th}$ symbol, an $m^{th}$ shift, and a $j^{th}$ code; and
determining whether n equals $N_{av}$ pilot symbols, wherein n comprises a variable used in the averaging loop and $N_{av}$ represents a number of pilot symbols in the averaging loop.

5. The method as recited in claim 4, wherein the peak stored in the buffer comprises
a peak_buffer(n, m, j)=mag(sum(PCP(f).*conj($\alpha$(m)).*conj(PCPref(f,j)))), where $\alpha$(m) is the phase shift array and PCP(f) is a permanent common pilot.

6. The method as recited in claim 5, wherein in an instance in which n equals Nav pilot symbols, further comprising
calculating an average peak for the $m^{th}$ shift, and the $j^{th}$ code, where peak (m, j)=sum(peak_buffer(n, m, j)).

7. The method as recited in claim 6, wherein the executing of the sliding correlator further comprises:
determining whether a highest average peak, peak(m, j), is greater than a maxpeak,
wherein in an instance in which the highest average peak is greater than the maxpeak, the executing of the sliding correlator further comprises
computing a first and second highest peaks and a ratio thereof, where max2peak=maxpeak, maxpeak=peak(m, j), and peak_ratio=max2peak/maxpeak.

8. The method as recited in claim 7, wherein the executing of the sliding correlator comprises:
determining whether the peak_ratio is less than a threshold, and
in an instance in which the peak_ratio is less than the threshold, causing storage of the first and second highest peaks, and best code for the $m^{th}$ shift.

9. The method as recited in claim 8, wherein the executing of the sliding correlator comprises:
finding the $m^{th}$ shift with a lowest peak ratio, wherein [min_ratio, m_shift]=min(peak2(m)/peak(m)), wherein peak(m)=maxpeak and peak2(m) is greater than max2peak,
determining whether min_ratio is less than the threshold, and
in an instance in which min_ratio is less than the threshold, determining that the best candidate code found is PCPbestcode=PCPcode(m shift).

10. The method as recited in claim 3, wherein executing the sliding correlator comprises a processor executing the sliding correlator.

11. A computer program product comprising a non-transitory computer readable medium storing a computer program, the computer program being configured to at least perform:
using a sliding correlator with a frequency division phase-shift;
averaging a peak magnitude output of the sliding correlator over a predetermined number of sub-frames for each of a plurality of possible reference pilot sequences and each of a plurality of sample shifts of the sliding correlator;
causing first and second maximum peaks to be stored in an instance in which a ratio between respective first and second maximum peaks is less than a threshold;
causing a pilot sequence index candidate for each of the plurality of sample shifts of the sliding correlator to be stored; and
selecting the pilot sequence index candidate with a lowest peak ratio to shift the sliding correlator.

12. A computer program product comprising a non-transitory computer readable medium storing a computer program, the computer program being configured to at least perform:
receiving a signal; and
executing a sliding correlator by applying a phase-shift in a frequency domain combined with an averaging and threshold mechanism to the signal to determine a pilot sequence with a time-division multiplexed pilot structure for cell acquisition and cell measurements, wherein applying the phase-shift in the frequency domain combined with the averaging and threshold mechanism comprises averaging a peak magnitude output of the sliding correlator for a predetermined number of sub-frames, and wherein the sliding correlator is shifted using a pilot sequence index candidate with a lowest peak ratio.

13. The computer program product as recited in claim 12, wherein the executing of the sliding correlator comprises:
performing an averaging loop;
obtaining a pilot orthogonal frequency division multiplexing symbol at a primary synchronization channel;
performing a Fast fourier transform, with zero unpadding and demultiplexing pilot sub-carriers;
performing a sliding correlator loop;
computing a phase shift array;
performing a code search loop;
causing a peak to be stored in a buffer for an $n^{th}$ symbol, an $m^{th}$ shift, and a $j^{th}$ code; and
determining whether n equals $N_{av}$ pilot symbols, wherein n comprises a variable used in the averaging loop and $N_{av}$ represents a number of pilot symbols in the averaging loop.

14. The computer program product as recited in claim 13, wherein the peak stored in the buffer comprises:
a peak buffer(n, m, j)=mag(sum(PCP(f).*conj($\alpha$(m)).*conj(PCPref(f,j)))), where $\alpha$(m) is the phase shift array and PCP(f) is a permanent common pilot.

15. The computer program product as recited in claim 14, wherein in an instance in which n equals Nav pilot symbols, further comprising
calculating an average peak for the $m^{th}$ shift, and the $j^{th}$ code, where peak (m, j)=sum(peak_buffer(n, m, j)).

16. The computer program product as recited in claim 15, wherein the executing of the sliding correlator comprises:
determining whether a highest average peak, peak(m, j), is greater than a maxpeak, wherein in an instance in which the highest average peak is greater than the maxpeak, further comprising
computing a first and second highest peaks and a ratio thereof, where max2peak=maxpeak, maxpeak=peak(m, j), and peak_ratio=max2peak/maxpeak.

17. The computer program product as recited in claim 16, wherein the executing of the sliding correlator comprises:
determining whether the peak_ratio is less than a threshold, and in an instance in which the peak_ratio is less than the threshold, causing storage of the first and second highest peaks, and best code for the $m^{th}$ shift.

18. The computer program product as recited in claim 17, wherein the executing of the sliding correlator comprises:
finding the $m^{th}$ shift with a lowest peak ratio, wherein [min_ratio, m_shift]=min(peak2(m)/peak(m)), wherein peak(m)=maxpeak and peak2(m) is greater than max2peak,
determining whether min_ratio is less than the threshold, and
in an instance in which min_ratio is less than the threshold, determining that the best candidate code found is PCPbestcode=PCPcode(m_shift).

19. An apparatus comprising at least one processor and at least one memory storing computer program code, wherein the at least one memory and stored computer program code are configured, with the at least one processor, to cause the apparatus to at least:
use a sliding correlator with a frequency division phase-shift;
average a peak magnitude output of the sliding correlator over a predetermined number of sub-frames for each of a plurality of possible reference pilot sequences and each of a plurality of sample shifts of the sliding correlator;
cause storage of first and second maximum peaks in an instance in which a ratio between respective first and second maximum peaks is less than a threshold;
cause storage of a pilot sequence index candidate for each of a plurality of shifts of the sliding correlator; and
select the pilot sequence index candidate with a lowest peak ratio to shift the sliding correlator.

20. An apparatus comprising at least one processor and at least one memory storing computer program code, wherein the at least one memory and stored computer program code are configured, with the at least one processor, to cause the apparatus to at least:
receive a signal; and
execute a sliding correlator by applying a phase-shift in a frequency domain combined with an averaging and threshold mechanism to the signal to determine a pilot sequence with a time-division multiplexed pilot structure for cell acquisition and cell measurements, wherein applying the phase-shift in the frequency domain combined with the averaging and threshold mechanism comprises averaging a peak magnitude output of the sliding correlator for a predetermined number of sub-frames, and wherein the sliding correlator is shifted using a pilot sequence index candidate with a lowest peak ratio.

21. The apparatus as recited in claim 20, wherein the at least one memory and stored computer program code are configured, with the at least one processor, to further cause the apparatus to:
perform an averaging loop;
obtain a pilot orthogonal frequency division multiplexing symbol at a primary synchronization channel;
perform a fast fourier transform, with zero unpadding and demultiplexing pilot sub-carriers;
perform a sliding correlator loop;
compute a phase shift array;
perform a code search loop;
cause storage of a peak in a buffer for an $n^{th}$ symbol, an $m^{th}$ shift, and a $j^{th}$ code; and
determine whether n equals $N_{av}$ pilot symbols, wherein n comprises a variable used in the averaging loop and $N_{av}$ represents a number of pilot symbols in the averaging loop.

22. The apparatus as recited in claim 21, wherein the peak stored in the buffer comprises
a peak_buffer(n, m, j)=mag(sum(PCP(f).*conj($\alpha$(m)).*conj(PCPref(f,j)))), where $\alpha$(m) is the phase shift array and PCP(f) is a permanent common pilot.

23. The apparatus as recited in claim 22, wherein in an instance in which n equals Nav pilot symbols, the at least one memory and stored computer program code are configured, with the at least one processor, to further cause the apparatus to
calculate an average peak for the $m^{th}$ shift, and the $j^{th}$ code, where peak (m, j)=sum(peak_buffer(n, m, j)).

24. The apparatus as recited in claim 23, wherein the at least one memory and stored computer program code are configured, with the at least one processor, to cause the apparatus to execute the sliding correlator by determining whether a highest average peak, peak(m, j), is greater than a maxpeak, and in an instance in which the highest average peak is greater than the maxpeak, computing a first and second highest peaks and a ration thereof, where max2peak=maxpeak, maxpeak=peak(m, j), and peak_ratio=max2peak/maxpeak.

25. The apparatus as recited in claim 24, wherein the at least one memory and stored computer program code are configured, with the at least one processor, to cause the apparatus to execute the sliding correlator by
determining whether the peak_ratio is less than a threshold, and
in an instance in which the peak_ratio is less than the threshold, causing storage of the first and second highest peaks, and best code for the $m^{th}$ shift.

26. The apparatus as recited in claim 25, wherein the at least one memory and stored computer program code are configured, with the at least one processor, to cause the apparatus to execute the sliding correlator by
finding the $m^{th}$ shift with a lowest peak ratio, wherein [min_ratio, m_shift]=min(peak2(m)/peak(m)), wherein peak(m)=maxpeak and peak2(m) is greater than max2peak,
determining whether min ratio is less than the threshold, and
in an instance in which min ratio is less than the threshold, determining that the best candidate code found is PCPbestcode=PCPcode(m_shift).

27. An apparatus comprising:
means for receiving a signal; and
means for executing a sliding correlator by applying a phase-shift in a frequency domain combined with an averaging and threshold mechanism to the signal to determine a pilot sequence with a time-division multiplexed pilot structure for cell acquisition and cell measurements, wherein applying the phase-shift in the frequency domain combined with the averaging and threshold mechanism comprises averaging a peak magnitude output of the sliding correlator for a predetermined number of sub-frames, and wherein the sliding correlator is shifted using a pilot sequence index candidate with a lowest peak ratio.

28. An apparatus comprising:
means for using a sliding correlator with a frequency division phase-shift;
means for averaging a peak magnitude output of the sliding correlator over a predetermined number of sub-frames for each of a plurality of possible reference pilot sequences and each of a plurality of sample shifts of the sliding correlator;

means for storing first and second maximum peaks in an instance in which a ratio between respective first and second maximum peaks is less than a threshold;

means for storing a pilot sequence index candidate for each of the plurality of sample shifts of the sliding correlator; and means for selecting the pilot sequence index candidate with a lowest peak ratio to shift the sliding correlator.

* * * * *